(12) United States Patent
Hara

(10) Patent No.: US 10,641,380 B2
(45) Date of Patent: May 5, 2020

(54) BRAKE ASSEMBLY STRUCTURE OF TRANSMISSION, TRANSMISSION, AND VEHICLE

(71) Applicant: Honda Motor Co.,Ltd., Tokyo (JP)

(72) Inventor: Hiroaki Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 15/912,569

(22) Filed: Mar. 6, 2018

(65) Prior Publication Data

US 2018/0266521 A1 Sep. 20, 2018

(30) Foreign Application Priority Data

Mar. 15, 2017 (JP) .................................. 2017-049950

(51) Int. Cl.
*F16H 57/10* (2006.01)
*F16H 61/14* (2006.01)
(Continued)

(52) U.S. Cl.
CPC .............. *F16H 57/10* (2013.01); *B60T 1/062* (2013.01); *F16D 11/14* (2013.01);
(Continued)

(58) Field of Classification Search
CPC .... F16H 3/66; F16H 57/10; F16H 2200/2012; F16H 2200/2035; F16H 2200/2046; F16H 2200/2048; F16H 2200/2066; F16H 2200/2069; F16H 2200/2082; B60T 1/062; F16D 67/04; F16D 25/0635; F16D 11/14

See application file for complete search history.

(56) References Cited

U.S. PATENT DOCUMENTS 3,599,512 A * 8/1971 Wayman ............. F16H 61/0262
188/72.4
3,701,623 A * 10/1972 Mori ...................... B60K 17/06
475/285

(Continued)

FOREIGN PATENT DOCUMENTS

JP 2014181743 9/2014
JP 2014202248 10/2014

OTHER PUBLICATIONS

"Office Action of Japan Counterpart Application", dated Sep. 25, 2018, with English translation thereof, p. 1-p. 4.

*Primary Examiner* — Jacob S. Scott
*Assistant Examiner* — Lori Wu
(74) *Attorney, Agent, or Firm* — JCIPRNET

(57) ABSTRACT

There is provided a brake assembly structure for a transmission. An automatic transmission includes a torque converter, a transmission case, and a two-way clutch and a first brake which are accommodated in the transmission case and adjacent to each other. The first brake includes a drum, an outer plate that is fixed to the drum in such a manner that the outer plate is unrotatable with respect to the drum, an inner disk that comes in contact with the outer plate in an axial direction, and a hub to which the inner disk is fixed in such a manner that relative rotation is not permitted. The drum is provided separately from the transmission case and includes a hydraulic chamber. The two-way clutch is assembled in the transmission case and the first brake is then assembled in the transmission case.

7 Claims, 13 Drawing Sheets

(51) Int. Cl.
  *F16D 11/14*     (2006.01)
  *F16D 25/0635*   (2006.01)
  *F16D 67/04*     (2006.01)
  *B60T 1/06*      (2006.01)
  *F16H 3/66*      (2006.01)
  *F16H 59/46*     (2006.01)
  *F16D 127/04*    (2012.01)
  *F16D 127/06*    (2012.01)
  *F16D 121/24*    (2012.01)

(52) U.S. Cl.
  CPC ......... *F16D 25/0635* (2013.01); *F16D 67/04* (2013.01); *F16H 3/66* (2013.01); *F16H 61/14* (2013.01); *F16D 2121/24* (2013.01); *F16D 2127/04* (2013.01); *F16D 2127/06* (2013.01); *F16H 2059/467* (2013.01); *F16H 2200/0069* (2013.01); *F16H 2200/2012* (2013.01); *F16H 2200/2035* (2013.01); *F16H 2200/2046* (2013.01); *F16H 2200/2048* (2013.01); *F16H 2200/2066* (2013.01); *F16H 2200/2082* (2013.01)

(56) References Cited

U.S. PATENT DOCUMENTS

| | | | | |
|---|---|---|---|---|
| 3,830,082 A | * | 8/1974 | Clauss, Jr. | F16D 25/0638 403/355 |
| 3,977,272 A | * | 8/1976 | Neumann | F16H 3/66 475/281 |
| 2007/0184933 A1 | * | 8/2007 | Maguire | F16H 3/66 475/275 |
| 2018/0298991 A1 | * | 10/2018 | Mayhew | F16H 3/66 |

* cited by examiner

| | C1 | C2 | C3 | B1 | B2 | B3 | F1 | GEAR RATIO | COMMON RATIO |
|---|---|---|---|---|---|---|---|---|---|
| Rvs | | | ◯ | | ◯ | | L | 4.008 | |
| 1st | | | | ◯ | (◯) | | R/L | 5.233 | |
| 2nd | | ◯ | | ◯ | ◯ | | R | 3.367 | 1.554 |
| 3rd | | | ◯ | ◯ | ◯ | | R | 2.298 | 1.465 |
| 4th | | ◯ | ◯ | ◯ | | | R | 1.705 | 1.348 |
| 5th | ◯ | | (◯) | ◯ | | | R | 1.363 | 1.251 |
| 6th | ◯ | ◯ | ◯ | | | | R | 1.000 | 1.363 |
| 7th | ◯ | | ◯ | | ◯ | | R | 0.786 | 1.273 |
| 8th | ◯ | ◯ | | | ◯ | | R | 0.657 | 1.196 |
| 9th | ◯ | | | | ◯ | ◯ | R | 0.584 | 1.126 |
| 10th | ◯ | ◯ | | | | ◯ | R | 0.520 | 1.120 |

BRAKE ASSEMBLY STRUCTURE OF TRANSMISSION, TRANSMISSION, AND VEHICLE

CROSS-REFERENCE TO RELATED APPLICATION

This application claims the priority of Japan patent application serial no. 2017-049950, filed on Mar. 15, 2017. The entirety of the above-mentioned patent application is hereby incorporated by reference herein and made a part of this specification.

BACKGROUND

Technical Field

The disclosure relates to a brake assembly structure of a transmission in which two adjacent brakes are provided adjacent to a torque converter, and a transmission and vehicle using the same.

Description of Related Art

In the related art, a transmission including a torque converter and two brakes is known (for example, refer to Patent Document 1: Japanese Patent Application Laid-Open No. 2014-202248). The two brakes are adjacent to each other and disposed adjacent to the torque converter.

SUMMARY

In a transmission including a torque converter case and an electric motor case, in an order from the side opposite to a rotor on the side of a driving source such as a torque converter and an electric motor, components of the transmission such as a brake are assembled in a transmission case in an axial direction. Accordingly, the transmission case has a shape whose diameter gradually increases toward the rotor.

Incidentally, when two adjacent brakes are provided adjacent to the rotor, if a piston, a hydraulic chamber, and the like of the brake on the side of the rotor are provided in the transmission case, the transmission case has a shape whose diameter gradually increases toward the rotor according to the relationship of assembly, and additionally, if a space in which the piston is disposed, the hydraulic chamber, an oil passage of the hydraulic chamber, and the like are provided in the transmission case, it is necessary to provide a space in which the piston is disposed, the hydraulic chamber, the oil passage, and the like radially outward from the brake assembled in advance, which results in a case of the inner diameter or the outer diameter of the transmission case increasing.

In addition, although the provision of the piston and the oil passage on the side of the rotor is conceivable in order to prevent the size of the transmission case from increasing, a degree of freedom of a layout of components of the rotor such as the torque converter and the electric motor decreases.

The embodiments of the invention provide a brake assembly structure of a transmission through which it is possible to prevent an inner diameter or an outer diameter of a case from increasing and a degree of freedom of a layout of components of a rotor such as a torque converter and an electric motor from decreasing.

An embodiment of the invention provides a brake assembly structure of a transmission that comprises a rotor (for example, a torque converter 2 of an embodiment; hereinafter the same) on a side of a driving source (for example, an engine E of an embodiment; hereinafter the same), a transmission case (for example, a transmission case 10 of an embodiment; hereinafter the same) disposed adjacent to the driving source, and two adjacent brakes (for example, a two-way clutch F1 and a first brake B1 of an embodiment; hereinafter the same) accommodated in the case. Between the two brakes, one brake (for example, the first brake B1 of an embodiment; hereinafter the same) on a side of the rotor comprises a drum (for example, a drum 112 of an embodiment; hereinafter the same), an outer plate (for example, an outer plate 114 of an embodiment; hereinafter the same) fixed to the drum in such a manner that the outer plate is unrotatable with respect to the drum, an inner disk (for example, an inner disk 116 of an embodiment; hereinafter the same) that comes in contact with the outer plate in an axial direction, and a hub (for example, a hub 118 of an embodiment; hereinafter the same) to which the inner disk is fixed in such a manner that relative rotation is not permitted. The drum and the hub are provided separately from the case. The drum or the hub comprises a hydraulic chamber (for example, a hydraulic chamber 124 of an embodiment; hereinafter the same). The brake assembly structure is configured that other brake between the two brakes (for example, the two-way clutch F1 of the embodiment; hereinafter the same) is assembled in the case, and the other brake is then assembled.

According to one or some exemplary embodiments of the invention, since the hydraulic chamber provided in the transmission case in the related art is provided in the drum or the hub, it is possible that the hydraulic chamber is not provided in the case such that it is positioned outward from the other brake attached in advance as in the related art, and the inner diameter or the outer diameter of the case is prevented from increasing, and since the hydraulic chamber of the brake is not provided in the rotor such as the torque converter and the electric motor, it is possible to prevent a degree of freedom of a layout of components of a rotor from decreasing.

In addition, in one or some embodiments of the invention, a two-way clutch (for example, the two-way clutch F1 of the embodiment; hereinafter the same) can be used for the other brake.

In addition, a transmission (for example, an automatic transmission 3 of an embodiment; hereinafter the same) of an embodiment of the invention includes the brake assembly structure of the above-described transmission, an input unit (for example, an input shaft 11 (input member) of an embodiment; hereinafter the same), and an output unit (for example, an output member 13 including an output gear of an embodiment; hereinafter the same).

In addition, a vehicle (for example, a vehicle V of an embodiment; hereinafter the same) of an embodiment of the invention includes the above-described transmission, a driving source (for example, an engine E of an embodiment; hereinafter the same) configured to output a driving force to the transmission, and wheels (for example, front wheels WFL and WFR of an embodiment; hereinafter the same) that rotate due to the driving force output from the transmission.

DESCRIPTION OF THE EMBODIMENTS

Regarding a transmission of the embodiments of the invention, a transmission to which an embodiment of a brake assembly structure is applied and a vehicle in which the transmission is mounted will be described below with reference to the drawings.

Figure 1:
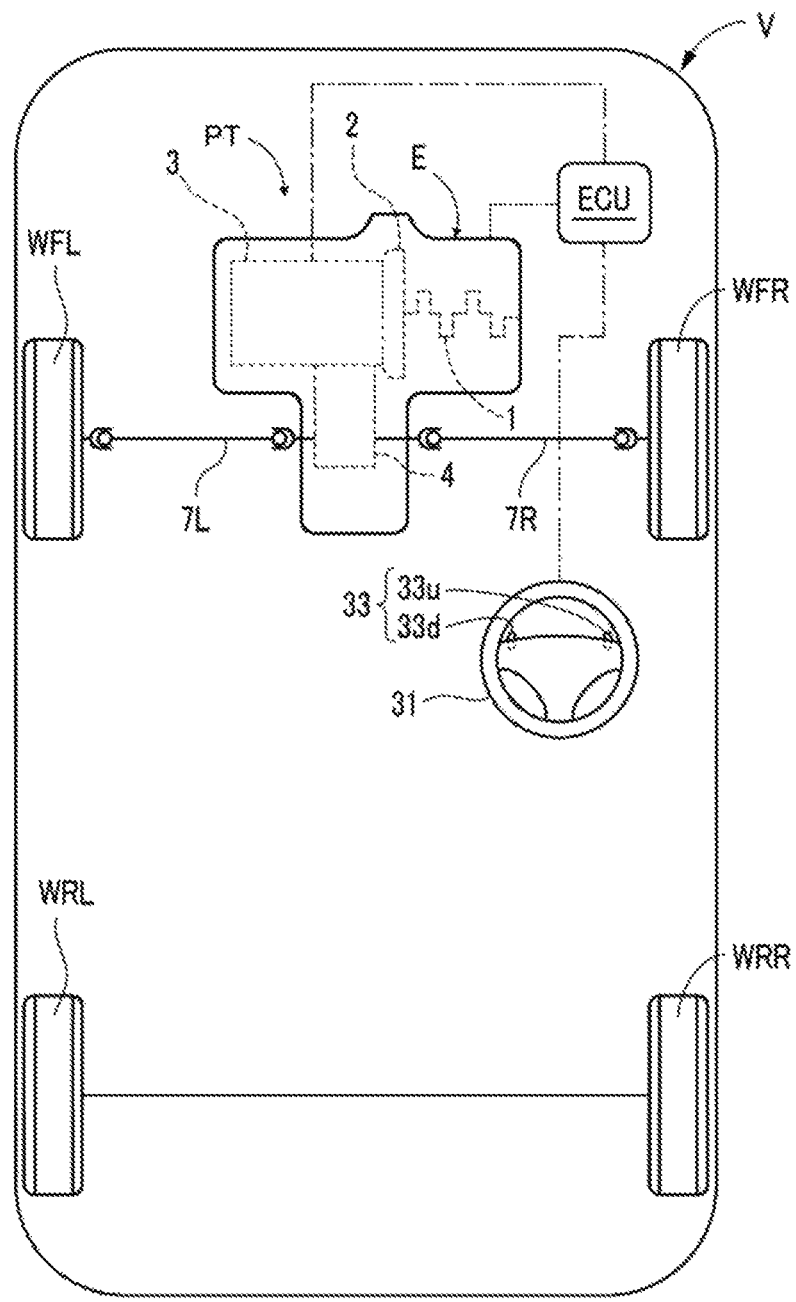
FIG. 1 is an explanatory diagram schematically showing a vehicle in which a transmission of an embodiment of the invention is mounted.

As shown in FIG. 1, regarding a transmission of the present embodiment, in a vehicle V in which a transmission to which a brake assembly structure is applied is mounted, an engine E (an internal combustion engine as a driving source; an electric motor may be used in place of the engine E) is mounted in a vehicle body sideways so that a crankshaft 1 is directed in the left to right direction in the vehicle body. A driving force output from the engine E is transmitted to a power transmission device PT. Then, the power transmission device PT adjusts a driving force of the engine E according to a selected gear ratio and transmits it to left and right front wheels WFL and WFR.

The power transmission device PT includes an automatic transmission 3 having a torque converter 2 connected to the crankshaft 1 and a front differential gear 4 connected to the automatic transmission 3.

The front differential gear 4 is connected to the left and right front wheels WFL and WFR through a front left axle 7L and a front right axle 7R.

Figure 2:
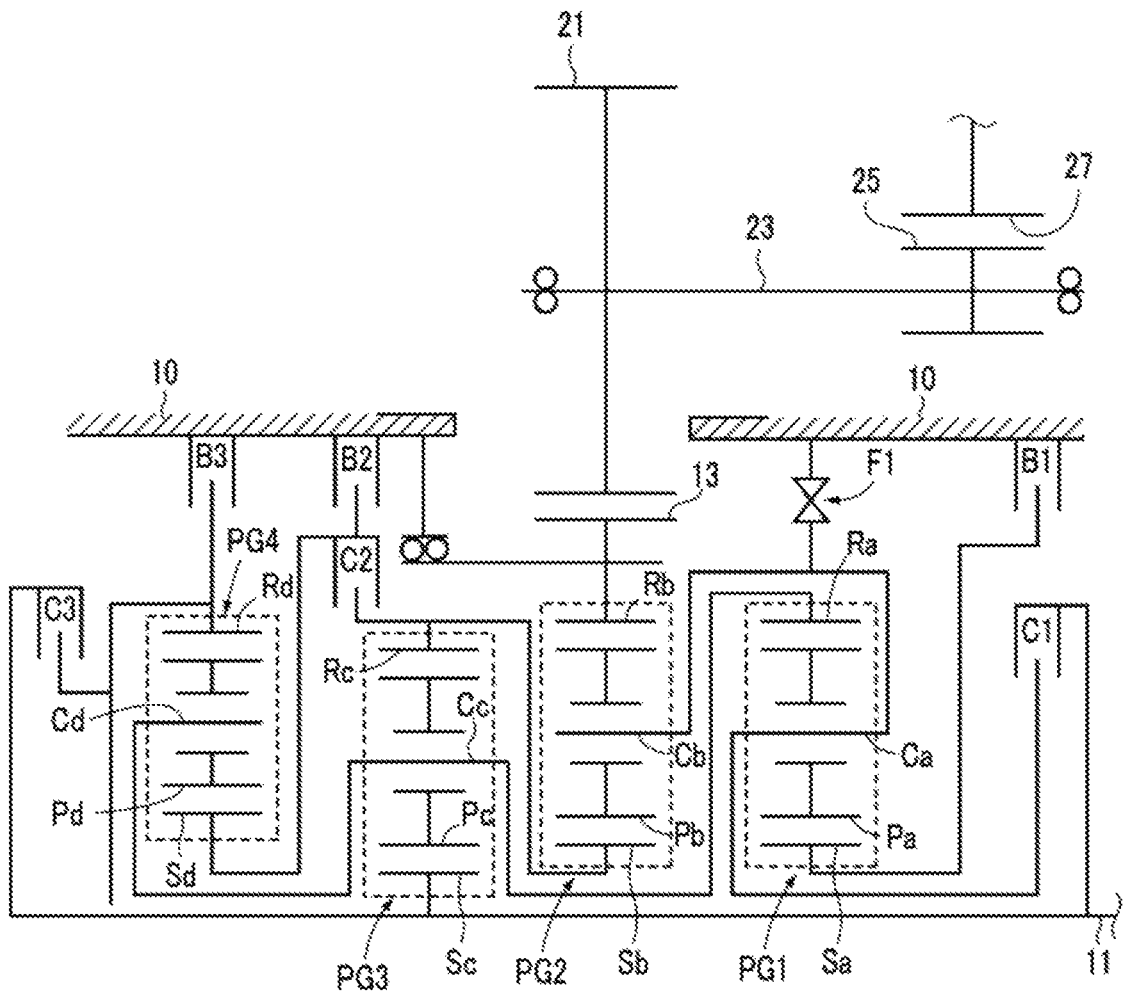
FIG. 2 is a skeleton diagram showing the transmission of the present embodiment.

FIG. 2 is a skeleton diagram showing a part of the automatic transmission 3 excluding the torque converter 2. The automatic transmission 3 includes an input shaft 11 that is rotatably pivotally supported in a transmission case 10 as a housing, as an input member to which a driving force output from the engine E is transmitted through the torque converter 2 including a lock-up clutch and a damper, and an output member 13 including an output gear that is disposed concentrically with the input shaft 11. Here, a hybrid vehicle in which an electric motor is provided in place of the torque converter 2 and which is driven using an internal combustion engine and the electric motor as a power source may be used.

Rotation of the output member 13 is transmitted to left and right drive wheels (the front wheels WFL and WFR) of a vehicle through an idle gear 21 meshed with the output member 13, an idle shaft 23 pivotally supporting the idle gear 21, a final drive gear 25 pivotally supported on the idle shaft 23, and the front differential gear 4 including a final driven gear 27 meshed with the final drive gear 25. Here, in place of the torque converter 2, a frictionally engageable single plate type or multi-plate type starting clutch may be provided. In addition, a propeller shaft can be connected in place of the front differential gear 4 and applied to a rear wheel drive vehicle. In addition, a propeller shaft can be connected to the front differential gear 4 via a transfer and applied to a four-wheel drive vehicle.

Inside the transmission case 10 as a housing, four planetary gear mechanisms (first to fourth planetary gear mechanisms PG1 to PG4) are disposed concentrically with the input shaft 11 in order from a side of an engine E serving as a driving source. The third planetary gear mechanism PG3 is a so-called single pinion type planetary gear mechanism which includes a sun gear Sc, a ring gear Re, and a carrier Cc that pivotally supports a pinion Pc meshed with the sun gear Sc and the ring gear Rc rotatably and revolvingly.

The so-called single pinion type planetary gear mechanism is also called a minus planetary gear mechanism or a negative planetary gear mechanism because the ring gear rotates in a direction different from that in the sun gear when the carrier is fixed and the sun gear is rotated. Here, in the so-called single pinion type planetary gear mechanism, when the ring gear is fixed and the sun gear is rotated, the carrier rotates in the same direction as the sun gear.

Figure 3:
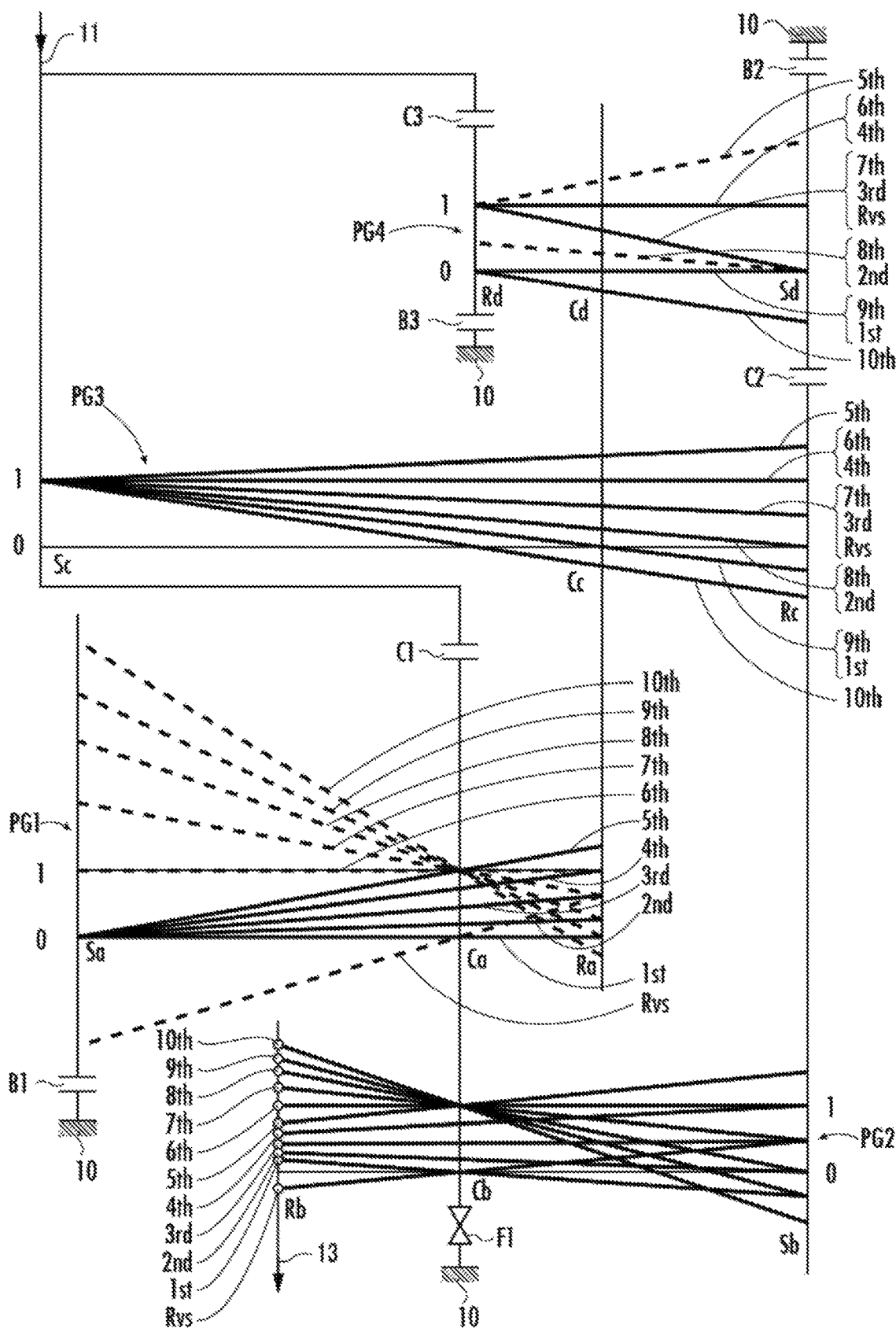
FIG. 3 is an alignment chart of a planetary gear mechanism of the present embodiment.

With reference to an alignment chart (a diagram that can express ratios between relative rotational speeds of the three elements of the sun gear, the carrier, and the ring gear by straight lines (speed lines)) of the third planetary gear mechanism PG3 shown in the second part from the top in FIG. 3, when the three elements Sc, Cc, and Rc of the third planetary gear mechanism PG3 are referred to as a first element, a second element, and a third element from the left side, respectively, in the order of arrangement at intervals corresponding to the gear ratio (the number of teeth of the ring gear/the number of teeth of the sun gear) in the alignment chart, the first element is the sun gear Sc, the second element is the carrier Cc, and the third element is the ring gear Re.

Here, a ratio between an interval between the sun gear Sc and the carrier Cc and an interval between the carrier Cc and the ring gear Re is set to h:1 when the gear ratio of the third planetary gear mechanism PG3 is h. Here, in the alignment chart, the lower horizontal line and the upper horizontal line (lines overlapping $4^{th}$ and $6^{th}$) indicate a rotational speed of "0" and "1" (the same rotational speed as the input shaft 11), respectively.

The fourth planetary gear mechanism PG4 is a so-called single pinion type planetary gear mechanism which includes a sun gear Sd, a ring gear Rd, and a carrier Cd that pivotally supports a pinion Pd meshed with the sun gear Sd and the ring gear Rd rotatably and revolvingly.

With reference to an alignment chart of the fourth planetary gear mechanism PG4 shown in the first part (the top part) from the top in FIG. 3, when the three elements Sd, Cd, and Rd of the fourth planetary gear mechanism PG4 are referred to as a fourth element, a fifth element, and a sixth element from the left side, respectively, in the order of arrangement at intervals corresponding to the gear ratio in the alignment chart, the fourth element is the ring gear Rd, the fifth element is the carrier Cd, and the sixth element is the sun gear Sd. A ratio between an interval between the sun gear Sd and the carrier Cd and an interval between the carrier Cd and the ring gear Rd is set to i:1 when the gear ratio of the fourth planetary gear mechanism PG4 is i.

The first planetary gear mechanism PG1 is a so-called single pinion type planetary gear mechanism which includes a sun gear Sa, a ring gear Ra, and a carrier Ca that pivotally supports a pinion Pa meshed with the sun gear Sa and the ring gear Ra rotatably and revolvingly.

With reference to an alignment chart of the first planetary gear mechanism PG1 shown in the third part from the top in FIG. 3, when the three elements Sa, Ca, and Ra of the first planetary gear mechanism PG1 are referred to as a seventh element, an eighth element, and a ninth element from the left side, respectively, in the order of arrangement at intervals corresponding to the gear ratio in the alignment chart, the seventh element is the sun gear Sa, the eighth element is the carrier Ca, and the ninth element is the ring gear Ra. A ratio between an interval between the sun gear Sa and the carrier Ca and an interval between the carrier Ca and the ring gear Ra is set to j:1 when the gear ratio of the first planetary gear mechanism PG1 is j.

The second planetary gear mechanism PG2 is a so-called single pinion type planetary gear mechanism which includes a sun gear Sb, a ring gear Rb, and a carrier Cb that pivotally supports a pinion Pb meshed with the sun gear Sb and the ring gear Rb rotatably and revolvingly.

With reference to an alignment chart of the second planetary gear mechanism PG2 shown in the fourth part (the bottom part) from the top in FIG. 3, when the three elements Sb, Cb, and Rb of the second planetary gear mechanism PG2 are referred to as a tenth element, an eleventh element, and a twelfth element from the left side, respectively, in the order of arrangement at intervals corresponding to the gear ratio in the alignment chart, the tenth element is the ring gear Rb, the eleventh element is the carrier Cb, and the twelfth element is the sun gear Sb. A ratio between an interval between the sun gear Sb and the carrier Cb and an interval between the carrier Cb and the ring gear Rb is set to k:1 when the gear ratio of the second planetary gear mechanism PG2 is k.

The sun gear Sc (the first element) of the third planetary gear mechanism PG3 is connected to the input shaft 11. In addition, the ring gear Rb (the tenth element) of the second planetary gear mechanism PG2 is connected to the output member 13 including an output gear.

In addition, the carrier Cc (the second element) of the third planetary gear mechanism PG3, the carrier Cd (the fifth element) of the fourth planetary gear mechanism PG4, and the ring gear Ra (the ninth element) of the first planetary gear mechanism PG1 are connected to form a first connected body Cc-Cd-Ra. In addition, the ring gear Re (the third element) of the third planetary gear mechanism PG3 and the sun gear Sb (the twelfth element) of the second planetary gear mechanism PG2 are connected to form a second connected body Rc-Sb. In addition, the carrier Ca (the eighth element) of the first planetary gear mechanism PG1 and the carrier Cb (the eleventh element) of the second planetary gear mechanism PG2 are connected to form a third connected body Ca-Cb.

In addition, the automatic transmission of the present embodiment includes seven engagement mechanisms including three first to third clutches C1 to C3, three first to third brakes B1 to B3, and one two-way clutch F1.

The first clutch C1 is a hydraulically actuated wet multi-plate clutch and is switchable between a connected state in which the sun gear Sc (the first element) of the third planetary gear mechanism PG3 and the third connected body Ca-Cb are connected and an open state in which the connection is disconnected.

The third clutch C3 is a hydraulically actuated wet multi-plate clutch and is switchable between a connected state in which the sun gear Sc (the first element) of the third planetary gear mechanism PG3 and the ring gear Rd (the fourth element) of the fourth planetary gear mechanism PG4 are connected and an open state in which the connection is disconnected.

The second clutch C2 is a hydraulically actuated wet multi-plate clutch and is switchable between a connected state in which the sun gear Sd (the sixth element) of the fourth planetary gear mechanism PG4 and the second connected body Rc-Sb are connected and an open state in which the connection is disconnected.

The two-way clutch F1 also has a function as a fourth brake and allows forward rotation (rotation in the same direction as a rotation direction of the input shaft 11 and the output member 13) of the third connected body Ca-Cb, and is switchable between a reverse rotation prevention state in which reverse rotation is prevented and a fixed state in which the third connected body Ca-Cb is fixed to the transmission case 10.

In the reverse rotation prevention state, when a rotational force in a forward rotation direction is applied to the third connected body Ca-Cb, the two-way clutch F1 is put into an open state in which the rotation is allowed, and when a rotational force in a reverse rotation direction is applied, the two-way clutch F1 is put into a fixed state in which the rotation is prevented and the third connected body Ca-Cb is fixed to the transmission case 10. In the present embodiment, the two-way clutch corresponds to a switching mechanism:

The first brake B1 is a hydraulically actuated wet multi-plate clutch and is switchable between a fixed state in which the sun gear Sa (the seventh element) of the first planetary gear mechanism PG1 is fixed to the transmission case 10 and an open state in which the fixation is released.

The second brake B2 is a hydraulically actuated wet multi-plate clutch and is switchable between a fixed state in which the sun gear Sd (the sixth element) of the fourth planetary gear mechanism PG4 is fixed to the transmission case 10 and an open state in which the fixation is released. The third brake B3 is a hydraulically actuated wet multi-plate clutch and is switchable between a fixed state in which the ring gear Rd (the fourth element) of the fourth planetary gear mechanism PG4 is fixed to the transmission case 10 and an open state in which the fixation is released.

States of the clutches C1 to C3 and the brakes B1 to B3, and the two-way clutch F1 are switched on the basis of vehicle information such as a travel speed of a vehicle transmitted from an integrated control unit (not shown) by a transmission control device ECU including a transmission control unit (TCU) shown in FIG. 1.

The transmission control device ECU includes an electronic unit constituted by a CPU, a memory, and the like (not shown), and can receive predetermined vehicle information such as a travel speed and an accelerator opening of the vehicle V, a rotational speed and an output torque of the engine E, and operation information of a paddle shift lever 33, and execute a control program stored in a storage device such as a memory in the CPU, and thus controls the automatic transmission 3 (transmission mechanism).

As shown in FIG. 1, the paddle shift lever 33 is provided on a handle 31 of the vehicle V of the present embodiment, upshifting is performed by a manual operation when a right paddle 33u is pulled forward, and downshifting is performed by a manual operation when a left paddle 33d is pulled forward. An operation signal of the paddle shift lever 33 is transmitted to the transmission control device ECU.

Here, an operation unit for performing a manual operation is not limited to the paddle shift lever 33 of the embodiment. Another operation unit, for example, a shift lever disposed between a driver's seat and a passenger's seat or a button disposed on a handle may be used.

As shown in FIG. 2, on the axis of the input shaft 11, from the side of the engine E serving as the driving source and the torque converter 2, the first clutch C1, the first planetary gear mechanism PG1, the second planetary gear mechanism PG2, the third planetary gear mechanism PG3, the second clutch C2, the fourth planetary gear mechanism PG4, and the third clutch C3 are disposed in that order.

Then, the third brake B3 is disposed radially outward from the fourth planetary gear mechanism PG4, the second brake B2 is disposed radially outward from the second clutch C2, the first brake B1 is disposed radially outward from the first clutch C1, and the two-way clutch F1 is disposed radially outward from the first planetary gear mechanism PG1.

In this manner, when the three brakes B1 to B3 and the two-way clutch F1 are disposed radially outward from a planetary gear mechanism or a clutch, it is possible to reduce the axial length of the automatic transmission 3 compared with when the brakes B1 to B3 and the two-way clutches F1 are disposed in parallel along the axis of the input shaft 11 together with the planetary gear mechanisms and the clutches. Here, the third brake B3 may be disposed radially outward from the third clutch C3 and the second brake B2 may be disposed radially outward from the fourth planetary gear mechanism PG4.

Next, a case in which gear stages of the automatic transmission 3 of the embodiment are set will be described with reference to FIG. 3 and FIG. 4.

In order to set a first gear, the two-way clutch F1 is put into a reverse rotation prevention state (R in FIG. 4) and the first brake B1 and the second brake B2 are put into a fixed state. When the two-way clutch F1 is put into a reverse rotation prevention state (R) and the first brake B1 is put into a fixed state, reverse rotation of the third connected body Ca-Cb and the sun gear Sa (the seventh element) of the first planetary gear mechanism PG1 are prevented, and rotational speeds of the third connected body Ca-Cb and the sun gear Sa (the seventh element) of the first planetary gear mechanism PG1 are "0".

Accordingly, three elements (seventh to ninth elements Sa, Ca, and Ra) of the first planetary gear mechanism PG1 are put into a locked state in which relative rotation is not permitted, and a rotational speed of the first connected body Cc-Cd-Ra including the ring gear Ra (the ninth element) of the first planetary gear mechanism PG1 is "0." Then, a rotational speed of the ring gear Rb (the tenth element) of the second planetary gear mechanism PG2 to which the output member 13 is connected becomes "1st" shown in FIG. 3 and the first gear is set.

Here, in order to set the first gear, it is possible that the second brake B2 is not set in a fixed state. However, the second brake B2 is set in the first gear in a fixed state so that shifting from the first gear to a second gear to be described below can be performed smoothly. In addition, in order for an engine brake to be effective in the first gear, the two-way clutch F1 may be switched from a reverse rotation prevention state (R) to a fixed state (L).

In order to set the second gear, the two-way clutch F1 is put into a reverse rotation prevention state (R), the first brake B1 and the second brake B2 are put into a fixed state, and the second clutch C2 is put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4. Then, a rotational speed of the ring gear Rb (the tenth element) of the second planetary gear mechanism PG2 to which the output member 13 is connected is "$2^{nd}$" shown in FIG. 3, and the second gear is set.

In order to set a third gear, the two-way clutch F1 is put into a reverse rotation prevention state, the first brake B1 and the second brake B2 are put into a fixed state, and the third clutch C3 is put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3 connected to the input shaft 11. Since a rotational speed of the sun gear Sd (the sixth element) of the fourth planetary gear mechanism PG4 is "0" and a rotational speed of the ring gear Rd (the fourth element) is "1," a rotational speed of the carrier Cd (the fifth element), that is, a rotational speed of the first connected body Cc-Cd-Ra is i/(i+1).

Then, a rotational speed of the ring gear Rb (the tenth element) of the second planetary gear mechanism PG2 to which the output member 13 is connected is "$3^{rd}$" shown in FIG. 3, and the third gear is set.

In order to set a fourth gear, the two-way clutch F1 is put into a reverse rotation prevention state, the first brake B1 is put into a fixed state, and the second clutch C2 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the second clutch C2 is put into a connected state, the sun gear Sd (the sixth element) of the fourth planetary gear mechanism PG4 and the second connected body Rc-Sb rotate at the same speed. Accordingly, between the third planetary gear mechanism PG3 and the fourth planetary gear mechanism PG4, the carrier Cc (the second element) and the carrier Cd (the fifth element) are connected, and the ring gear Rc (the third element) and the sun gear Sd (the sixth element) are connected. In the fourth gear in which the second clutch C2 is put into a connected state, one alignment chart including four elements can be drawn by the third planetary gear mechanism PG3 and the fourth planetary gear mechanism PG4.

Then, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and rotational speeds of two elements among four elements constituted by the third planetary gear mechanism PG3 and the fourth planetary gear mechanism PG4 are the same speed of "1."

Accordingly, elements of the third planetary gear mechanism PG3 and the fourth planetary gear mechanism PG4 are put into a locked state in which relative rotation is not permitted, and rotational speeds of all elements of the third planetary gear mechanism PG3 and the fourth planetary gear mechanism PG4 are "1." Then, a rotational speed of the third connected body Ca-Cb is j/(j+1), and a rotational speed of the ring gear Rb (the tenth element) of the second planetary gear mechanism PG2 to which the output member 13 is connected is "$4^{th}$" shown in FIG. 3, and the fourth gear is set.

In order to set a fifth gear, the two-way clutch F1 is put into a reverse rotation prevention state, the first brake B1 is put into a fixed state, and the first clutch C1 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "$5^{th}$" shown in FIG. 3, and the fifth gear is set.

Here, in order to set the fifth gear, it is possible that the third clutch C3 is not set in a connected state. However, since the third clutch C3 is set in a connected state in the fourth gear and a sixth gear to be described below, the fifth gear is also put into a connected state so that downshifting from the fifth gear to the fourth gear and upshifting from the fifth gear to the sixth gear to be described below are performed smoothly.

In order to set the sixth gear, the two-way clutch F1 is put into a reverse rotation prevention state and three clutches (first to third clutches C1 to C3) are put into a connected state. When the two-way clutch F1 is put into a reverse rotation prevention state, forward rotation of the third connected body Ca-Cb is allowed.

In addition, when the second clutch C2 and the third clutch C3 are put into a connected state, as described in the fourth gear, elements of the third planetary gear mechanism PG3 and the fourth planetary gear mechanism PG4 are put into a state in which relative rotation is not permitted and a rotational speed of the second connected body Rc-Sb is "1." In addition, when the first clutch C1 is put into a connected state, a rotational speed of the third connected body Ca-Cb is "1."

Accordingly, in the second planetary gear mechanism PG2, the carrier Cb (the eleventh element) and the sun gear Sb (the twelfth element) are the same speed of "1," and elements are put into a locked state in which relative rotation is not permitted. Then, a rotational speed of the ring gear Rb (the tenth element) of the second planetary gear mechanism PG2 to which the output member 13 is connected is "1" of "$6^{th}$" shown in FIG. 3, and the sixth gear is set.

In order to set a seventh gear, the two-way clutch F1 is put into a reverse rotation prevention state, the second brake B2 is put into a fixed state, and the first clutch C1 and the third clutch C3 are put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and a rotational speed of the first connected body Cc-Cd-Ra including the carrier Cd (the fifth element) of the fourth planetary gear mechanism PG4 is i/(i+1).

In addition, when the first clutch C1 is put into a connected state, a rotational speed of the third connected body Ca-Cb is "1" that is the same speed as a rotational speed of the sun gear Sc (the first element) of the third planetary gear mechanism PG3 connected to the input shaft 11. Then, a rotational speed of the ring gear Rb (the tenth element) of the second planetary gear mechanism PG2 to which the output member 13 is connected is "$7^{th}$" shown in FIG. 3, and the seventh gear is set.

In order to set an eighth gear, the two-way clutch F1 is put into a reverse rotation prevention state, the second brake B2 is put into a fixed state, and the first clutch C1 and the second clutch C2 are put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4.

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "$8^{th}$" shown in FIG. 3, and the eighth gear is set.

In order to set a ninth gear, the two-way clutch F1 is put into a reverse rotation prevention state, the second brake B2 and the third brake B3 are put into a fixed state, and the first clutch C1 is put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third brake B3 is put into a fixed state, a rotational speed of the ring gear Rd (the fourth element) of the fourth planetary gear mechanism PG4 is "0." Therefore, elements Sd, Cd, and Rd of the fourth planetary gear mechanism PG4 are put into a locked state in which relative rotation is not permitted, and a rotational speed of the first connected body Cc-Cd-Ra including the carrier Cd (the fifth element) of the fourth planetary gear mechanism PG4 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "$9^{th}$" shown in FIG. 3, and the ninth gear is set.

In order to set a tenth gear, the two-way clutch F1 is put into a reverse rotation prevention state, the third brake B3 is put into a fixed state, and the first clutch C1 and the second clutch C2 are put into a connected state. When the two-way clutch F1 is put into a reverse rotation prevention state, forward rotation of the third connected body Ca-Cb is allowed.

In addition, when the second clutch C2 is put into a connected state, the second connected body Re-Sb and the sun gear Sd (the sixth element) of the fourth planetary gear mechanism PG4 rotate at the same speed. In addition, when the third brake B3 is put into a fixed state, a rotational speed of the ring gear Rd (the fourth element) of the fourth planetary gear mechanism PG4 is "0." In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "$10^{th}$" shown in FIG. 3, and the tenth gear is set.

In order to set a reverse gear, the two-way clutch F1 is put into a fixed state (L in FIG. 4), the second brake B2 is put into a fixed state, and the third clutch C3 is put into a connected state. When the second brake B2 is put into a fixed state and the third clutch C3 is put into a connected state, a rotational speed of the first connected body Cc-Cd-Ra is i/(i+1). In addition, when the two-way clutch F1 is put into a fixed state, a rotational speed of the third connected body Ca-Cb is "0." Then, a rotational speed of the ring gear Rb (the tenth element) of the second planetary gear mechanism PG2 to which the output member 13 is connected is reverse rotation "Rvs" shown in FIG. 3, and the reverse gear is set.

Here, speed lines indicated by dashed lines in FIG. 3 indicate that elements of other planetary gear mechanisms rotate (idle) following a planetary gear mechanism that transmits power among the four planetary gear mechanisms PG1 to PG4.

Figures 4, 5:
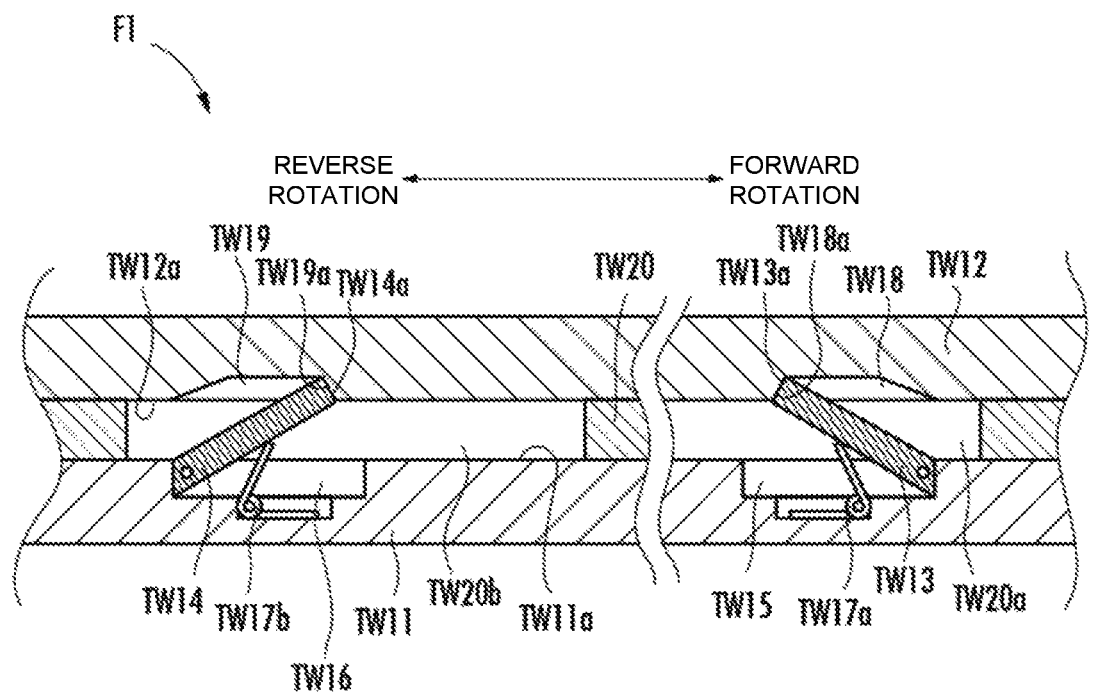
FIG. 4 is an explanatory diagram showing an engagement state of engagement mechanisms at gear stages of the present embodiment.
FIG. 5 is an explanatory diagram showing a fixed state of a two-way clutch of the present embodiment in a cross section.

FIG. 4 is a diagram collectively showing states of the clutches C1 to C3, the brakes B1 to B3, and the two-way clutch F1 at the above-described gear stages. "0" in the columns of the three clutches (first to third clutches C1 to C3), and the three brakes (first to third brakes B1 to B3) indicate a connected state or a fixed state, and blank columns indicate an open state. In addition, "R" in the column of the two-way clutch F1 indicates a reverse rotation prevention state and "L" indicates a fixed state.

In addition, the underlined "R" and "L" indicate that a rotational speed of the third connected body Ca-Cb is "0" due to the action of the two-way clutch F1. In addition, "R/L" indicates a state that is a reverse rotation prevention state "R" normally but switched to the fixed state "L" when an engine brake is effective.

In addition, FIG. 4 shows gear ratios (a rotational speed of the input shaft 11/a rotational speed of the output member 13) and common ratios (a ratio of gear ratios between gear stages; a value obtained by dividing a gear ratio of a predetermined gear stage by a gear ratio of a gear stage that is one gear stage higher than the predetermined gear stage) at gear stages when a gear ratio h of the third planetary gear mechanism PG3 is 2.734, a gear ratio i of the fourth planetary gear mechanism PG4 is 1.614, a gear ratio j of the first planetary gear mechanism PG1 is 2.681, and a gear ratio k of the second planetary gear mechanism PG2 is 1.914. Accordingly, it can be understood that common ratios can be appropriately set.

Next, the two-way clutch F1 will be described in detail with reference to FIG. 5 to FIG. 8. The two-way clutch F1 is switchable between a fixed state in which the third connected body Ca-Cb is fixed to the transmission case 10 and a reverse rotation prevention state in which forward rotation of the third connected body Ca-Cb is allowed and reverse rotation is prevented.

Figure 6:
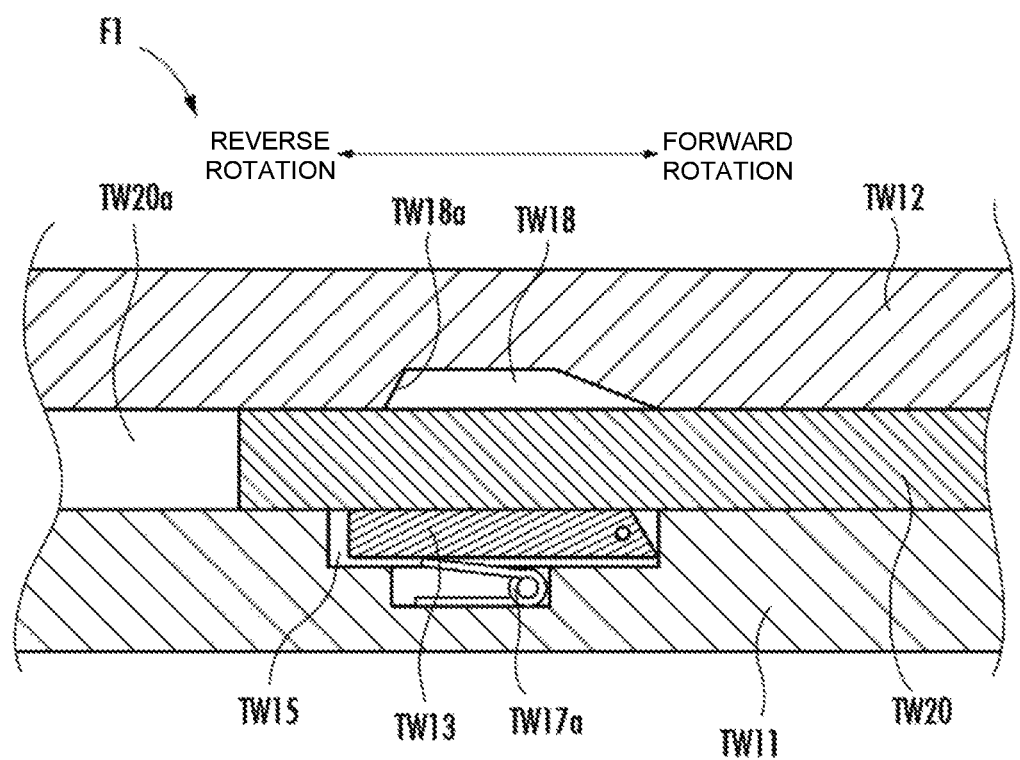
FIG. 6 is an explanatory diagram showing a reverse rotation prevention state of the two-way clutch of the present embodiment in a cross section.
Figure 7:
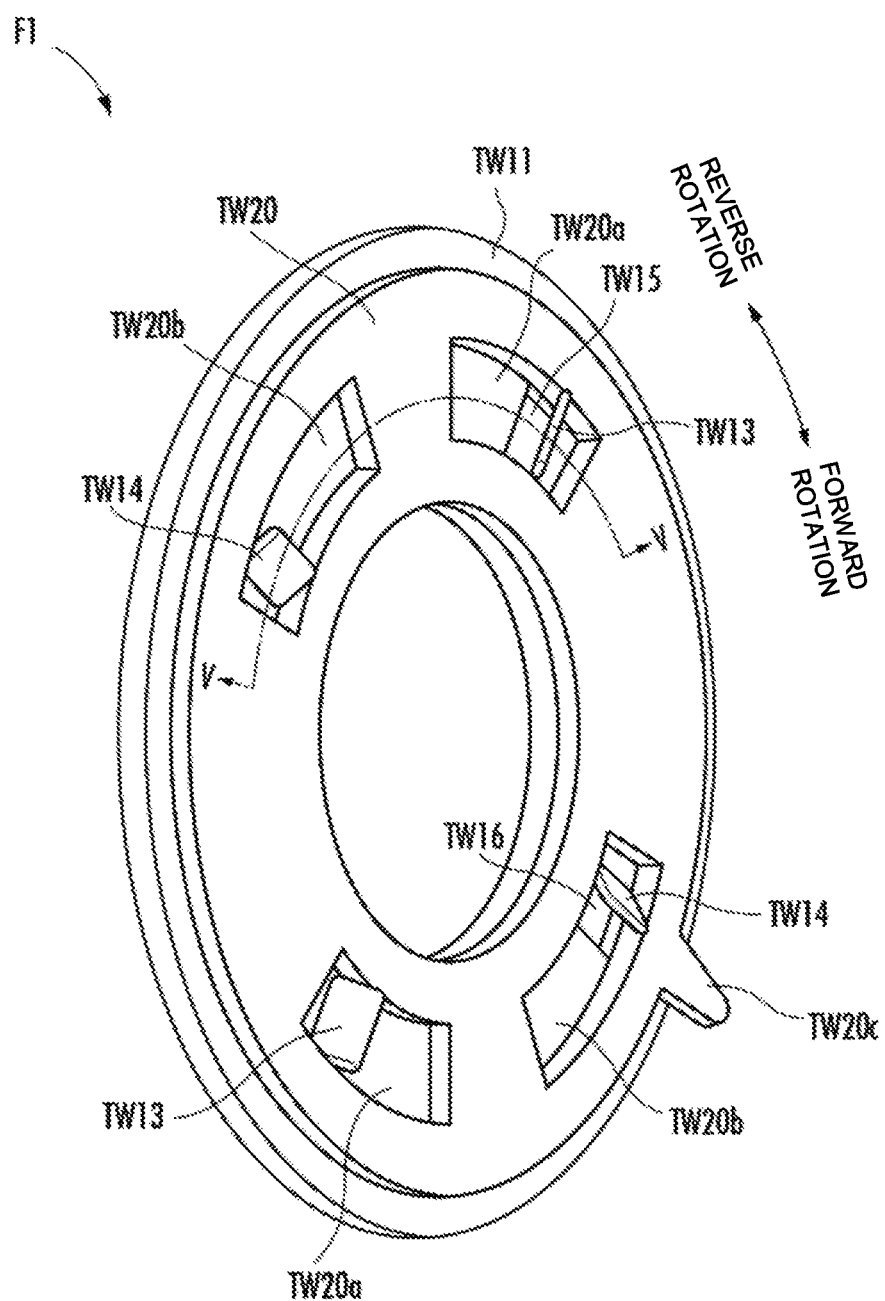
FIG. 7 is a perspective view showing a fixed state of the two-way clutch of the present embodiment.

As shown in cross sections in FIG. 5 and FIG. 6, the two-way clutch F1 includes a fixing plate TW11 and a rotating plate TW12 fixed to the transmission case 10. As shown in FIG. 7, the fixing plate TW11 is foil led in a ring shape (donut shape). In addition, although not shown in FIG. 7, the rotating plate TW12 is formed in a ring shape (donut shape) similarly to the fixing plate TW11, and the fixing plate TW11 and the rotating plate TW12 are disposed concentrically.

As shown in FIG. 5, on a facing surface TW11a that faces the rotating plate TW12 on the fixing plate TW11, a plate-like forward rotation prevention side swinging part TW13 in which an end TW13a on the other side (a direction in which the rotating plate TW12 rotates reversely) in a circumferential direction swings using an end on one side (a direction in which the rotating plate TW12 rotates forward) in the circumferential direction of the fixing plate TW11 as a shaft, and a plate-like reverse rotation prevention side swinging part TW14 in which an end TW14a on one side (forward rotation direction) in the circumferential direction swings using an end of the other side (reverse rotation direction) in the circumferential direction of the fixing plate TW11 as a shaft are provided.

In addition, on the facing surface TW11a of the fixing plate TW11, concave accommodation units TW15 and TW16 in which the forward rotation prevention side swinging part TW13 and the reverse rotation prevention side swinging part TW14 can be accommodated are provided. On bottoms of the accommodation units TW15 and TW16, biasing members TW17a and TW17b including springs for biasing the swinging parts TW13 and TW14 are provided so that the swinging ends TW13a and TW14a of the corresponding swinging parts TW13 and TW14 protrude from the accommodation units TW15 and TW16.

On a facing surface TW12a that faces the fixing plate TW11 on the rotating plate TW12, holes TW18 and TW19 are provided at positions corresponding to the swinging parts TW13 and TW14. At the first hole TW18 provided at a position corresponding to the forward rotation prevention side swinging part TW13, a first engagement part TW18a having a stepped shape that can be engaged with the swing end TW13a of the forward rotation prevention side swinging part TW13 is provided such that it is positioned on the other side (a reverse rotation direction side) in the circumferential direction of the rotating plate TW12.

At the second hole TW19 provided at a position corresponding to the reverse rotation prevention side swinging part TW14, a second engagement part TW19a having a stepped shape that can be engaged with the swing end TW14a of the reverse rotation prevention side swinging part TW14 is provided such that it is positioned on one side (a forward rotation direction side) in the circumferential direction of the rotating plate TW12.

As shown in FIG. 5 and FIG. 7, when the end TW13a of the forward rotation prevention side swinging part TW13 and the first engagement part TW18a are engageable and the end TW14a of the reverse rotation prevention side swinging part TW14 and the second engagement part TW19a are engageable, both forward rotation and reverse rotation of the rotating plate TW12 are prevented. Accordingly, a state in which the ends TW13a and TW14a and the engagement parts TW18a and TW19a corresponding thereto are engaged with each other is the fixed state in the two-way clutch F1 of the present embodiment.

A switch plate TW20 is interposed between the fixing plate TW11 and the rotating plate TW12. As shown in FIG. 7, the switch plate TW20 is formed in a ring shape (donut shape). On the switch plate TW20, notch holes TW20a and TW20b are provided at positions corresponding to the swinging parts TW13 and TW14.

Figure 8:
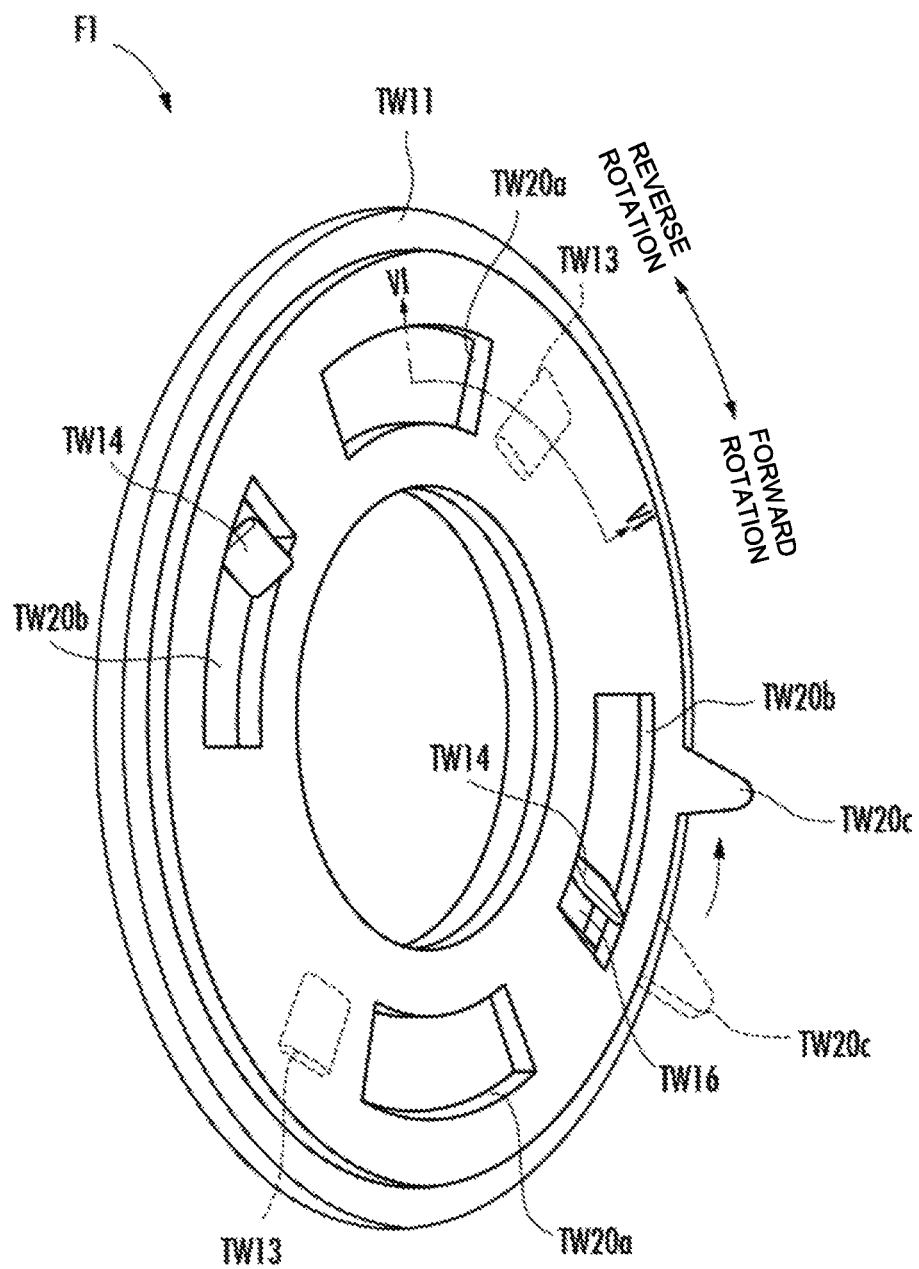
FIG. 8 is a perspective view showing a reverse rotation prevention state of the two-way clutch of the present embodiment.

A protrusion TW20c that protrudes radially outward is provided at the outer edge of the switch plate TW20. As shown in FIG. 8, the switch plate TW20 is freely swingable with respect to the fixing plate TW11.

When the switch plate TW20 is swung from the fixed state shown in FIG. 7 to the state shown in FIG. 8, as shown in FIG. 6, the first notch hole TW20a corresponding to the forward rotation prevention side swinging part TW13 exceeds the forward rotation prevention side swinging part TW13, and the forward rotation prevention side swinging part TW13 is pushed to the switch plate TW20 against the biasing force of the biasing member TW17a, and is accommodated in the accommodation unit TW15. Accordingly, engagement of the end TW13a of the forward rotation prevention side swinging part TW13 and the first engagement part TW18a is prevented. Accordingly, rotation of the rotating plate TW12 on the forward rotation side is allowed.

In addition, as shown in FIG. 8, in the second notch hole TW20b corresponding to the reverse rotation prevention side swinging part TW14, even if the switch plate TW20 is swung from the fixed state shown in FIG. 7 to the state shown in FIG. 8, the end TW14a can be engaged with the second engagement part TW19a without accommodating the reverse rotation prevention side swinging part TW14 in the accommodation unit TW16.

Accordingly, the state shown in FIG. 6 and FIG. 8 is a reverse rotation prevention state in the two-way clutch F1 of the present embodiment.

Figure 9:
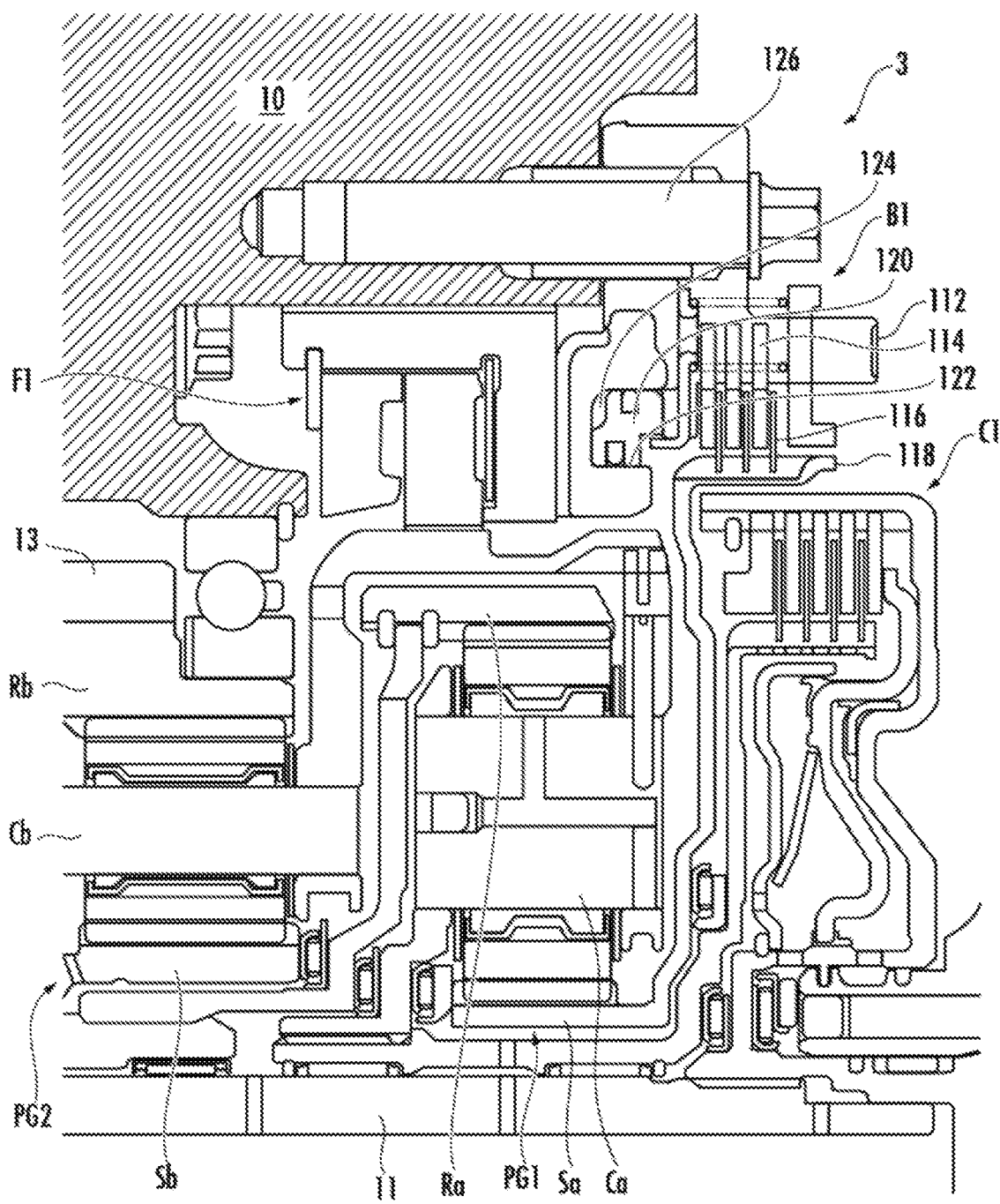
FIG. 9 is a sectional view showing an enlarged first brake of the present embodiment.

FIG. 9 is a sectional view showing the enlarged two-way clutch F1 and first brake B1. As shown in FIG. 9, the first brake B1 includes a drum 112 fixed to the transmission case 10, an outer plate 114 that is fixed to the drum 112 in such a manner that the outer plate 114 is unrotatable with respect to the drum 112, an inner disk 116 that is able to contact the outer plate 114 in the axial direction, and a hub 118 to which the inner disk 116 is fixed in such a manner that relative rotation is not permitted.

The drum 112 is provided separately from the transmission case 10. In addition, the drum 112 includes a piston disposition part 122 in which a piston 120 can be disposed, and the piston disposition part 122 and the piston 120 define a hydraulic chamber 124.

Figure 10:
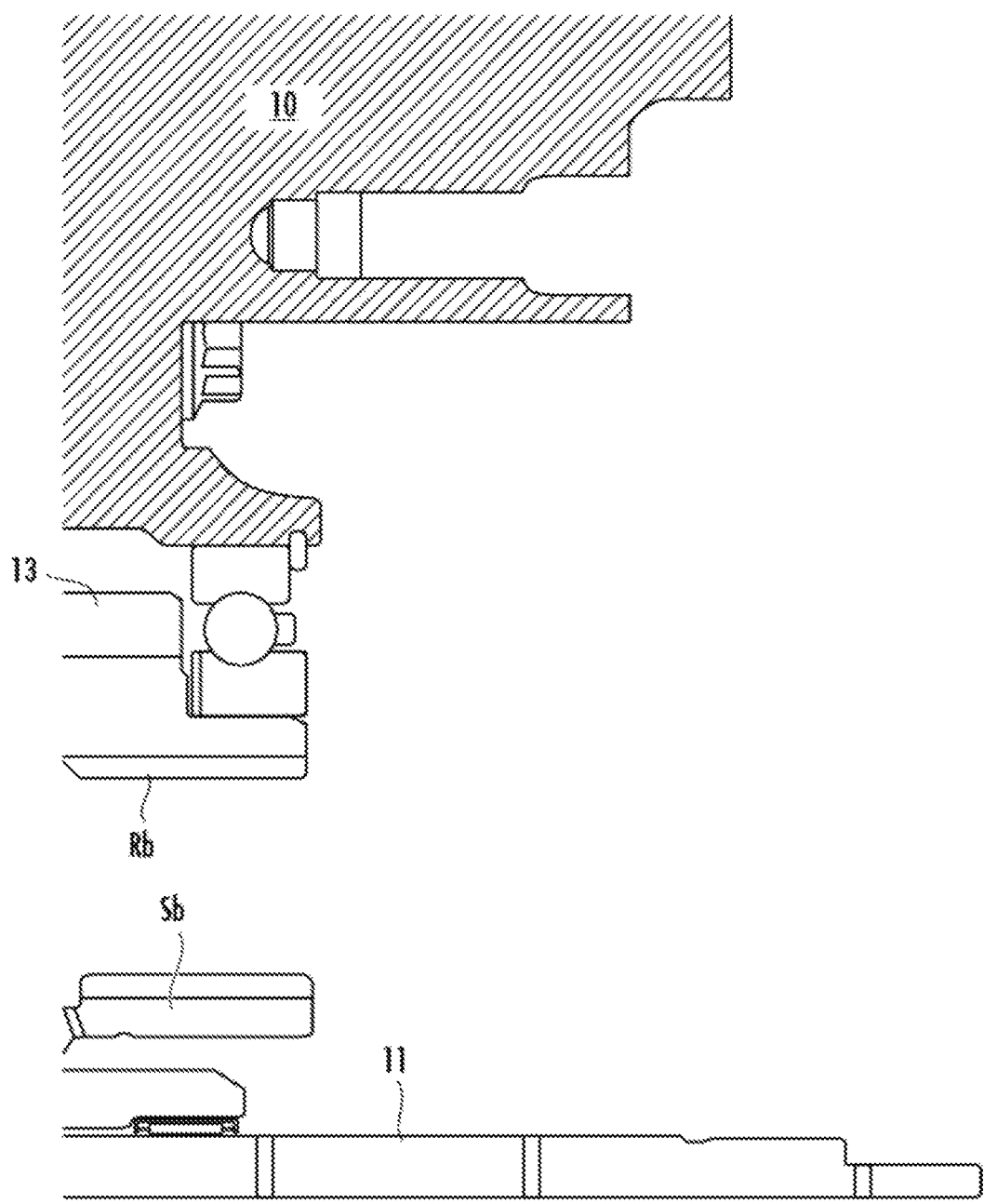
FIG. 10 is a sectional view showing a state in which assembly in FIG. 9 is in progress.

FIG. 10 shows a state in which the output member 13 (output gear), and the sun gear Sb and the ring gear Rb of the second planetary gear mechanism PG2 are assembled in the transmission case 10.

Figure 11:
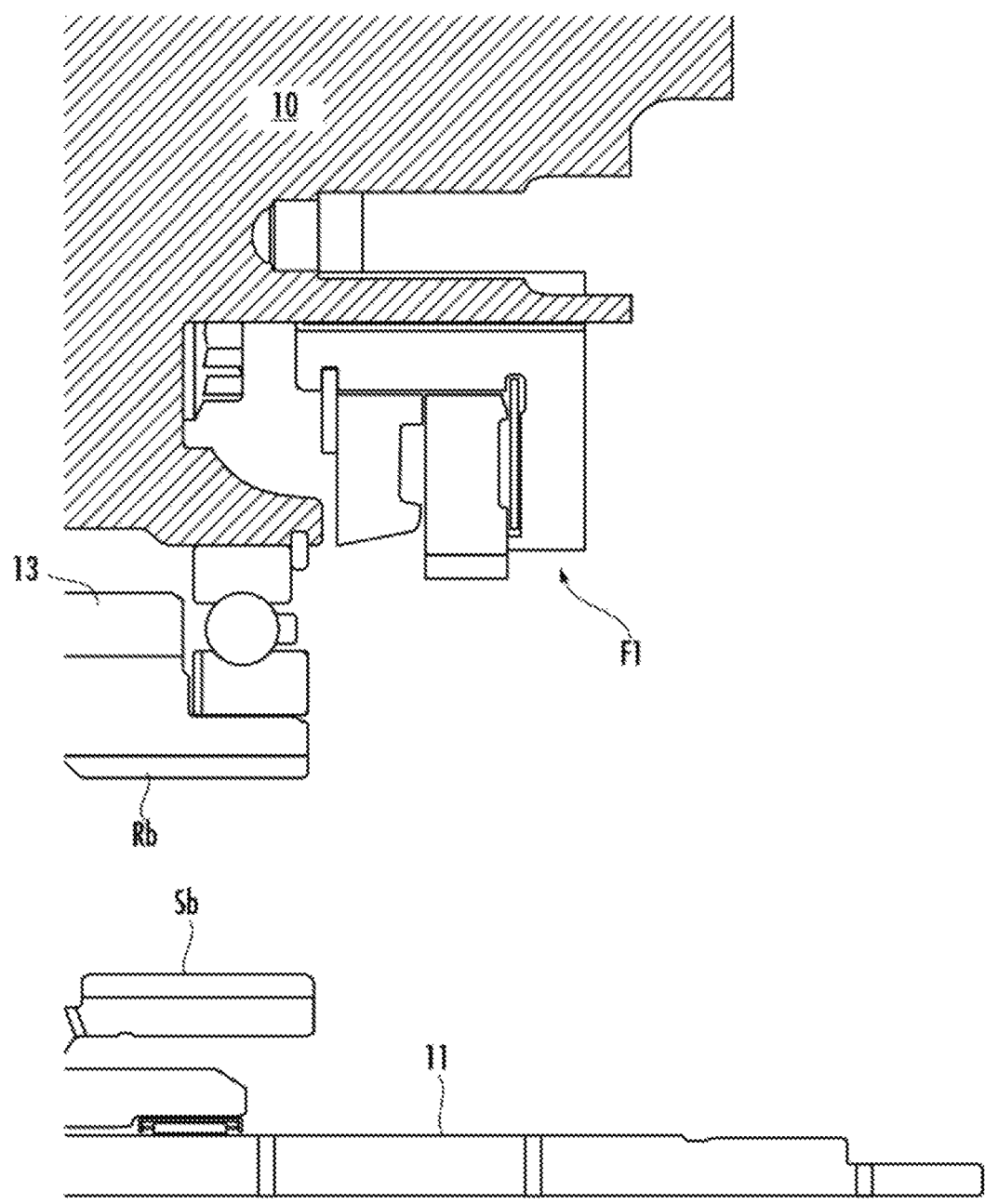
FIG. 11 is a sectional view showing a state in which the two-way clutch is assembled in FIG. 10.
Figure 13:
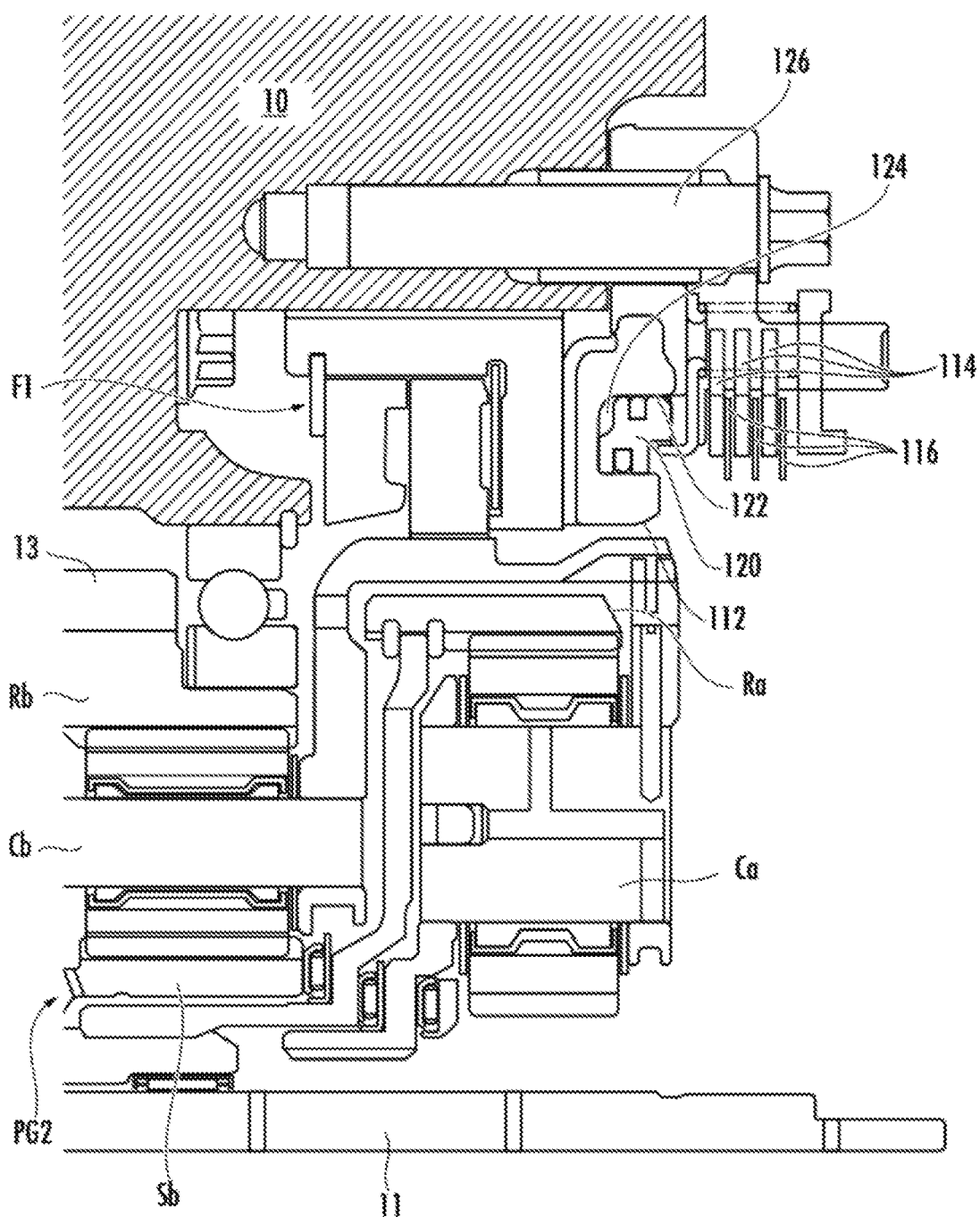
FIG. 13 is a sectional view showing a state in which a main part of the first brake is assembled in FIG. 12.

Then, as shown in FIG. 11, the two-way clutch F1 is fitted to the transmission case 10. Then, as shown in FIG. 13, the carrier Cb and the pinion Pb of the second planetary gear mechanism PG2 and the ring gear Ra, the carrier Ca, and the pinion Pa of the first planetary gear mechanism PG1 are assembled.

Figure 12:
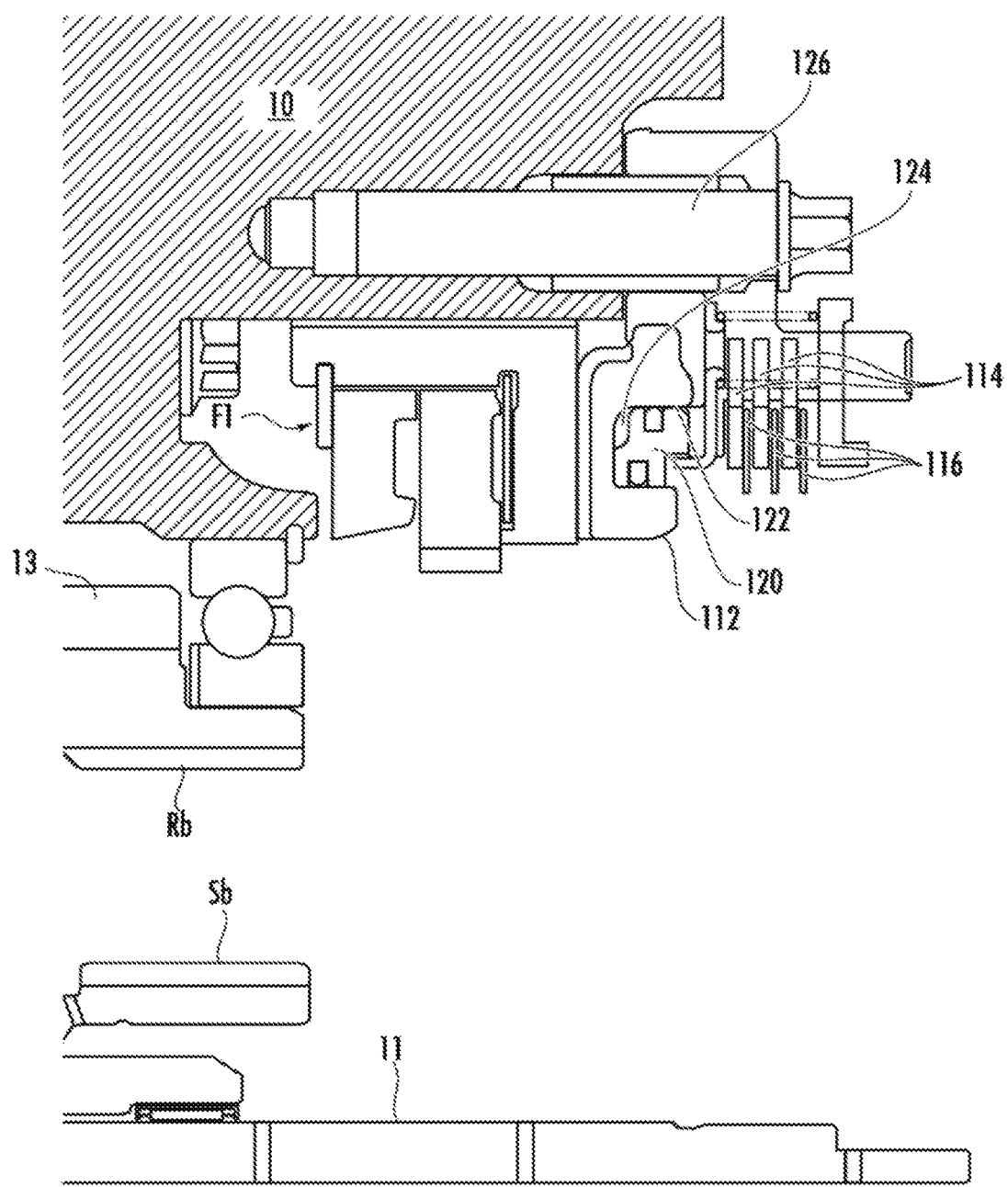
FIG. 12 is a sectional view showing a state in which a carrier is assembled in FIG. 11.
Figure 14:
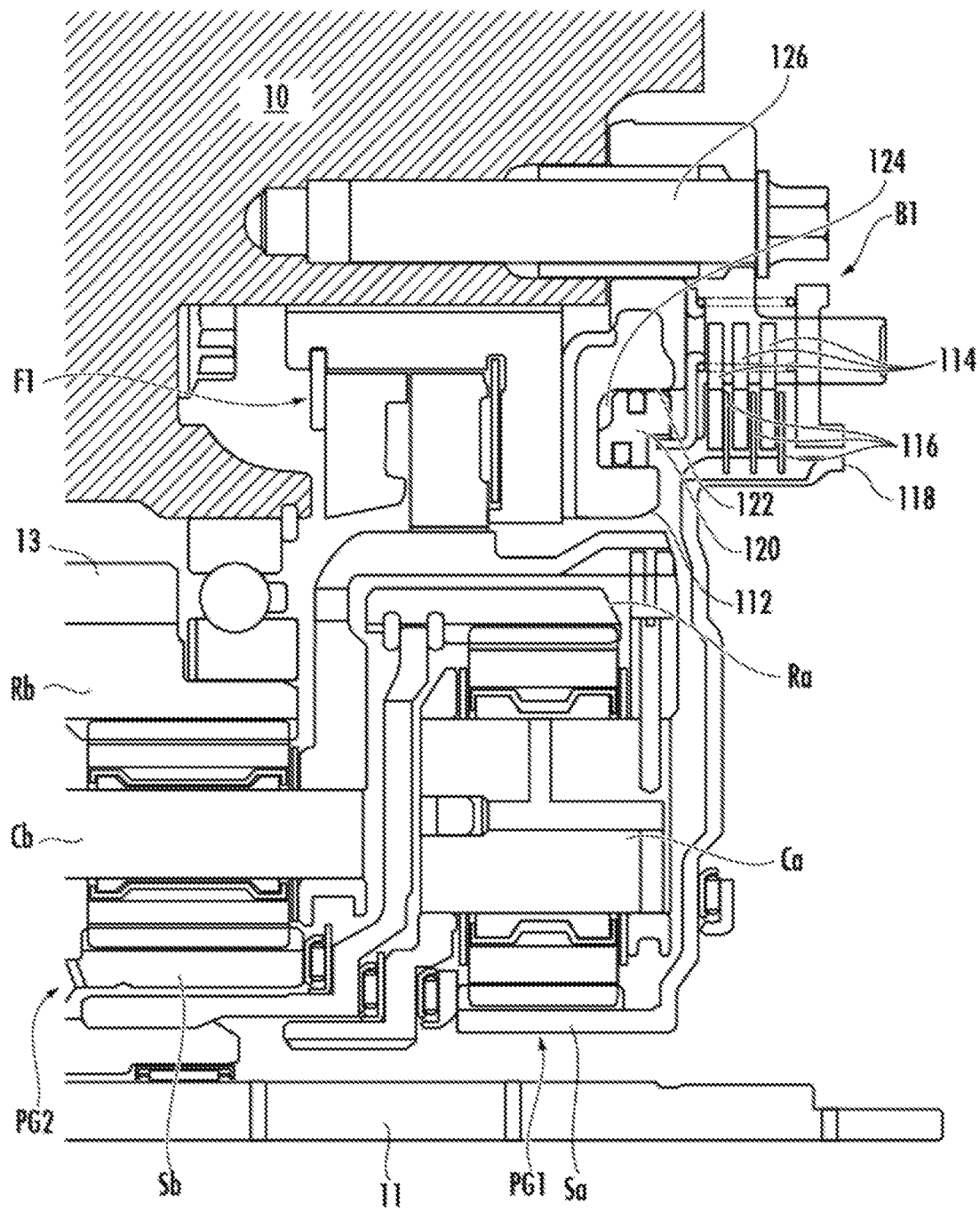
FIG. 14 is a sectional view showing a state in which a hub of the first brake is assembled in FIG. 13.

Then, as shown in FIG. 12, the drum 112, the outer plate 114, and the inner disk 116 of the first brake B1 are assembled. Then, as shown in FIG. 14, a member connecting the sun gear Sa and the hub 118 of the first planetary gear mechanism PG1 is assembled. Then, as shown in FIG. 9, after the first clutch C1 is assembled, the torque converter 2 is attached, and the automatic transmission 3 is assembled.

Here, in the automatic transmission 3 including the torque converter 2, components of the automatic transmission 3 such as a brake are assembled in the transmission case 10 in the axial direction in order from the side opposite to the torque converter 2. Accordingly, the transmission case 10 has a shape whose inner diameter gradually increases and/or whose outer diameter gradually increases toward the torque converter 2.

In addition, when two adjacent brakes such as the two-way clutch F1 (the two-way clutch F1 in this specification functions as a brake) and the first brake B1 of the present embodiment are provided adjacent to the torque converter 2, if the piston 120 and the hydraulic chamber 124 of the first brake B1 which is a brake on the side of the torque converter 2 and an oil passage through which a hydraulic pressure is transmitted to the hydraulic chamber 124, and the like are provided in the transmission case 10, the transmission case 10 has a shape whose diameter gradually increases toward the torque converter 2 according to the relationship of assembly, and additionally, if a space in which the piston is disposed, the hydraulic chamber, the oil passage of the hydraulic chamber, and the like are provided in the transmission case 10, it is necessary to provide a space in which the piston is disposed, the hydraulic chamber, the oil passage, and the like radially outward from the brake (corresponding to the two-way clutch F1 in the present embodiment) assembled in advance, which results in a case of the inner diameter or the outer diameter of the transmission case 10 increasing.

In addition, although the provision of the piston and the oil passage on the side of the torque converter 2 is conceivable in order to prevent the size of the transmission case 10 from increasing, a degree of freedom of a layout of components of the torque converter 2 decreases.

Thus, in the brake assembly structure of the transmission of the present embodiment, the drum 112 of the first brake B1 is provided separately from the transmission case 10, and the piston disposition part 122 in which the piston 120 is disposed is provided on the drum 112, and the piston 120 and the piston disposition part 122 define the hydraulic chamber 124. Then, the drum 112 is fixed to the transmission case 10 using a bolt 126.

In this manner, since the drum 112 includes the hydraulic chamber 124, it is possible that the hydraulic chamber of the first brake B1 is not provided in the transmission case 10 such that it is positioned outward from the two-way clutch F1 attached in advance, and the inner diameter or the outer diameter of the transmission case 10 is prevented from increasing, and the hydraulic chamber of the first brake B1 is not provided in the torque converter 2. Therefore, it is possible to prevent a degree of freedom of the layout of components of the torque converter 2 from decreasing.

In addition, while the two-way clutch F1 is fitted to the inner surface of the transmission case 10 from the side of the torque converter 2 in the axial direction, the two-way clutch F1 is fixed so that it does not move in the axial direction. In the automatic transmission 3 of the present embodiment, the drum 112 including the piston disposition part 122 is firmly fixed to the transmission case 10 using a bolt. Therefore, the two-way clutch F1 adjacent to the first brake B1 can be firmly restrained by the drum of the first brake B1, it is possible that a snap ring for thrust positioning for the two-way clutch F1 is not provided, and it is possible to reduce the number of components and simplify assembly.

Here, in the present embodiment, while a case in which the two-way clutch F1 is used as the other brake has been described, the other brake of the embodiments of the invention is not limited. For example, the other brake may be a wet multi-plate clutch with a one-way clutch installed.

In addition, a case in which the drum 112 is fixed to the transmission case 10, the hub 118 and the sun gear Sa of the first planetary gear mechanism PG1 are connected, and the hydraulic chamber 124 is provided on the drum 112 has been described in the present embodiment. However, the brake assembly structure of the transmission of the embodiments of the invention is not limited thereto. For example, the hub may be fixed to the transmission case, the hydraulic chamber may be provided, and the drum may be connected to the sun gear of the first planetary gear mechanism.

What is claimed is:

1. A brake assembly structure of a transmission comprising a rotor on a side of a driving source, a transmission case disposed adjacent to the driving source, and two adjacent brakes accommodated in the case,
    wherein, one of the two brakes on a side of the rotor comprises a drum, an outer plate that is fixed to the drum in such a manner that the outer plate is unrotatable with respect to the drum, an inner disk that is able to contact the outer plate in an axial direction, and a hub to which the inner disk is fixed in such a manner that relative rotation is not permitted,
    wherein the drum and the hub are provided separately from the case,
    wherein the drum comprises a hydraulic chamber,
    wherein the brake assembly structure is configured that the other of the two brakes is assembled in the case, and the one brake is then assembled, and
    the other brake is pressed by the one brake and the other brake is positioned by fixing the one brake onto the case.

2. The brake assembly structure of the transmission according to claim 1,
    wherein the other brake is a two-way clutch.

3. The transmission comprising:
    the brake assembly structure of the transmission according to claim 1;
    an input unit; and
    an output unit.

4. The transmission comprising:
    the brake assembly structure of the transmission according to claim 2;
    an input unit; and
    an output unit.

5. A vehicle comprising:
    the transmission according to claim 3;
    the driving source configured to output a driving force to the transmission; and
    a wheel that rotates due to the driving force output from the transmission.

6. A vehicle comprising:
    the transmission according to claim 4;
    the driving source configured to output a driving force to the transmission; and
    a wheel that rotates due to the driving force output from the transmission.

7. The brake assembly structure of a transmission according to claim 1,
    wherein the drum of the one brake is fixed to the case by a bolt in the axial direction, and the one brake abuts the other brake.

* * * * *